United States Patent
Kim et al.

(10) Patent No.: US 8,837,845 B2
(45) Date of Patent: Sep. 16, 2014

(54) METHOD AND APPARATUS FOR ENCODING AN INTRA-PREDICTION MODE USING VARIABLE LENGTH CODES, AND RECORDING MEDIUM FOR SAME

(75) Inventors: Sunyeon Kim, Seoul (KR); Jeongyeon Lim, Gyeonggi-do (KR); Yoonsik Choe, Gyeonggi-do (KR); Yungho Choi, Gyeonggi-do (KR); Yonggoo Kim, Seoul (KR); Jongho Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 414 days.

(21) Appl. No.: 13/391,497

(22) PCT Filed: Aug. 18, 2010

(86) PCT No.: PCT/KR2010/005448
§ 371 (c)(1),
(2), (4) Date: May 21, 2012

(87) PCT Pub. No.: WO2011/021844
PCT Pub. Date: Feb. 24, 2011

(65) Prior Publication Data
US 2012/0224777 A1   Sep. 6, 2012

(30) Foreign Application Priority Data

Aug. 21, 2009 (KR) .................. 10-2009-0077445

(51) Int. Cl.
*G06K 9/36* (2006.01)
*H04N 19/00* (2014.01)

(52) U.S. Cl.
CPC ...................................... *H04N 7/26* (2013.01)
USPC ........................................................ 382/238

(58) Field of Classification Search
USPC ................. 382/232–250; 375/240.01–240.29
See application file for complete search history.

(56) References Cited

U.S. PATENT DOCUMENTS 7,170,937 B2 * 1/2007 Zhou ........................ 375/240.01
7,881,377 B2 * 2/2011 Arimura et al. .......... 375/240.12

(Continued)

FOREIGN PATENT DOCUMENTS

JP      2005-252679       9/2005
KR    10-2007-0012168    1/2007

(Continued)

OTHER PUBLICATIONS

Kai Zhang et al. "An Efficient Coding Method for Intra Prediction mode Information", IEEE International Symposium on Circuits and Systems, May 24-27, 2009, pp. 2814-2817.

(Continued)

*Primary Examiner* — Ishrat I Sherali
(74) *Attorney, Agent, or Firm* — Lowe Hauptman & Ham, LLP (57) ABSTRACT

The disclosure relates to a method, apparatus, and recording medium for encoding an intra-prediction mode of an image using variable length codes, including: determining an intra prediction mode of a current block; determining an intra prediction mode having smallest mode number among intra prediction modes of encoded adjacent blocks as Most Probable Mode; generating and allocating variable length codes in ascending order from shorter code with higher similarity for directivity with MPM for all intra-prediction modes; and encoding intra prediction mode of current block based on allocated variable length codes, and thereby generates efficient variable length codes in consideration of high correlation in the intra-prediction modes of current block and peripheral blocks even if intra-prediction mode of current block does not match MPM derived with reference to peripheral blocks, and efficiently compressing information on intra-prediction mode of current block using variable length codes, thereby improving intra video encoding performance.

9 Claims, 8 Drawing Sheets

(56) References Cited

U.S. PATENT DOCUMENTS

| | | | |
|---|---|---|---|
| 8,244,050 B2 * | 8/2012 | Kim | 382/238 |
| 8,391,369 B2 * | 3/2013 | Han | 375/240.24 |
| 8,711,935 B2 * | 4/2014 | Kim et al. | 375/240.13 |
| 2007/0019726 A1 * | 1/2007 | Cha et al. | 375/240.12 |
| 2007/0025439 A1 * | 2/2007 | Han et al. | 375/240.1 |
| 2009/0022219 A1 * | 1/2009 | Goel | 375/240.08 |
| 2011/0292994 A1 * | 12/2011 | Lim et al. | 375/240.02 |
| 2012/0082221 A1 * | 4/2012 | Liu et al. | 375/240.12 |
| 2013/0114707 A1 * | 5/2013 | Seregin et al. | 375/240.12 |
| 2013/0128964 A1 * | 5/2013 | Chien et al. | 375/240.12 |

FOREIGN PATENT DOCUMENTS

| | | |
|---|---|---|
| KR | 1020080068275 A | 7/2008 |
| KR | 10-2009-0066035 | 6/2009 |
| KR | 10-2009-0075602 | 7/2009 |

OTHER PUBLICATIONS

Korean Office Action dated Feb. 26, 2014.
International Search Report mailed May 13, 2011 for PCT/KR2010/005448.

* cited by examiner

METHOD AND APPARATUS FOR ENCODING AN INTRA-PREDICTION MODE USING VARIABLE LENGTH CODES, AND RECORDING MEDIUM FOR SAME

CROSS REFERENCE TO RELATED APPLICATION

This application claims the priority of Korean Patent Application No. 10-2009-0077445, filed on Aug. 21, 2009 in the KIPO (Korean Intellectual Property Office. Further, this application is the National Phase application of International Application No. PCT/KR2010/005448 filed Aug. 18, 2010, which designates the United States and was published in Korean.

TECHNICAL FIELD

One aspect of the present disclosure relates to a technology for compressing image data. More particularly, the present disclosure relates to a method, an apparatus, and a recording medium for encoding an intra-prediction mode using variable length codes, and a recording medium for the same, which encode information on an intra-prediction direction of a current block by using variable length codes with reference to an intra-prediction direction of an adjacent block having a high correlation in an encoding of the intra-prediction direction of the current block to be encoded.

BACKGROUND ART

The statements in this section merely provide background information related to the present disclosure and may not constitute the prior art.

In general, one picture is divided into a plurality of macro blocks and then each of the macro blocks is encoded using an inter prediction and an intra prediction in order to encode an image in image compressing methods such as MPEG-2 (Moving Picture Experts Group-2), MPEG-4, and H.264/AVC (Advanced Video Coding).

The intra prediction efficiently removes spatial redundancy through performing an encoding with reference to a value of a physically adjacent pixel to a block to be encoded within a current picture. First, a prediction value for a current block to be encoded is calculated using the value of the adjacent pixel. Next, the difference between the prediction value and a pixel value of the current block is encoded through a DCT (Discrete Cosine Transform) and a quantization. Here, there are various intra prediction modes to predict the pixel value of the current block, and the modes are largely divided into a 4×4 intra prediction mode, an 8×8 intra prediction mode, a 16×16 intra prediction mode by a luminance component, and an intra prediction mode by a chrominance component.

Figure 1:
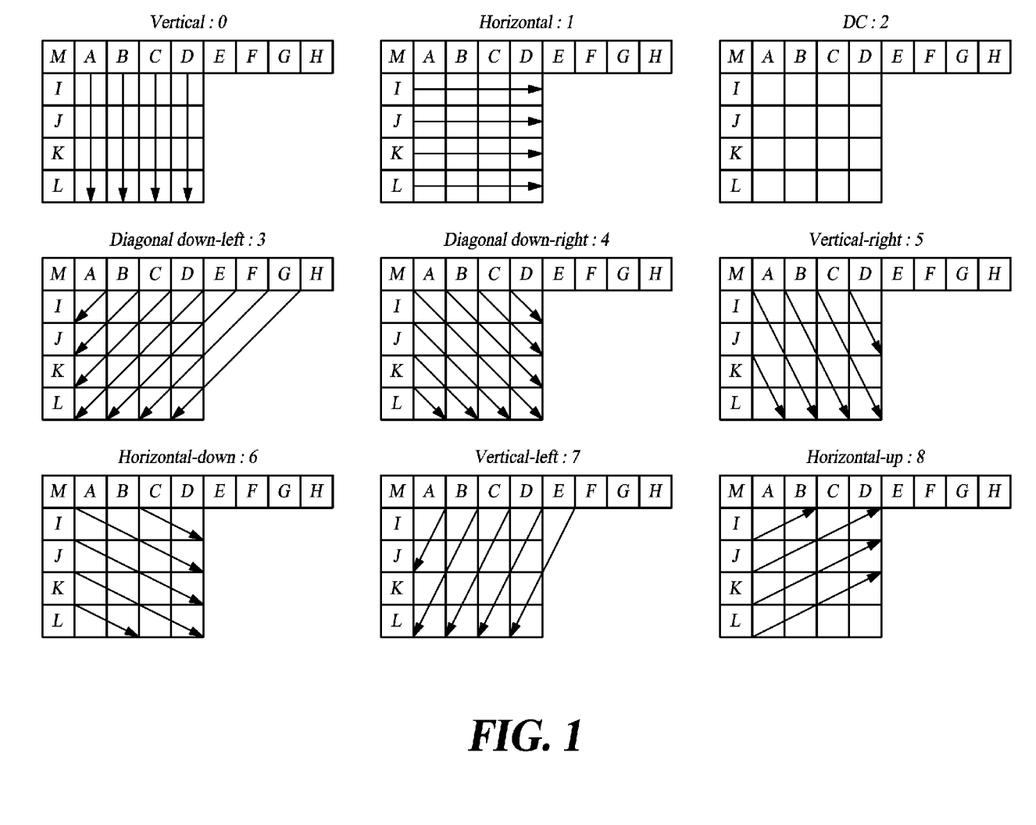
FIG. 1 illustrates nine prediction modes for a 4×4 intra prediction.
Figure 2:
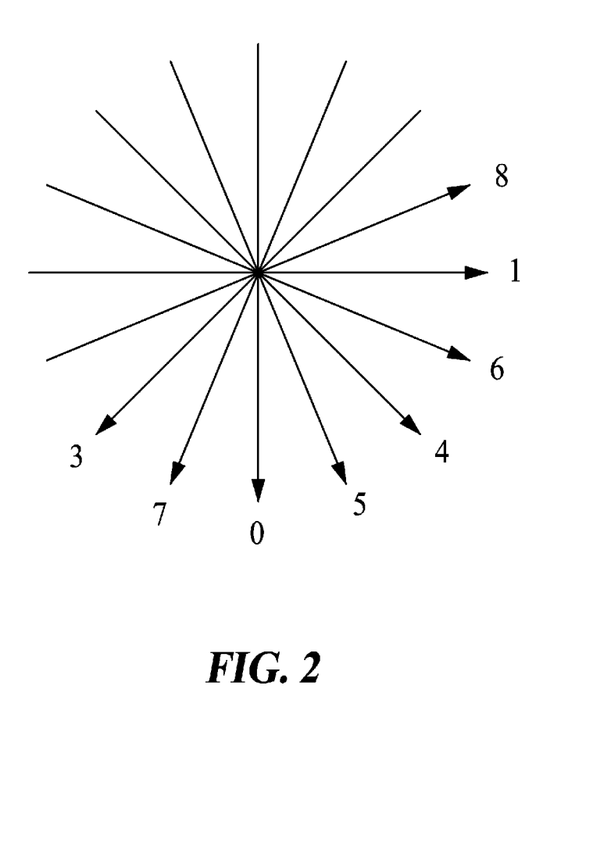
FIG. 2 illustrates eight directions of the 4×4 intra prediction.

FIGS. 1 and 2 illustrate the 4×4 intra prediction mode of H.264/AVC. FIG. 1 illustrates nine prediction modes for the 4×4 intra prediction and FIG. 2 illustrates eight directions of the 4×4 intra prediction mode.

Referring to FIG. 1, the 4×4 intra prediction mode has nine prediction modes which sequentially include a vertical mode, a horizontal mode, a direct current (DC) mode, a diagonal down-left mode, a diagonal down-right mode, a vertical-right mode, a horizontal-down mode, a vertical-left mode and a horizontal-up mode. Each of the nine intra prediction modes has one of mode numbers 0 to 8 according to its statistically used frequency. The vertical mode having a mode number "0" is most frequently used and the horizontal-up mode having a mode number "8" is least frequently used statistically.

Referring to FIG. 2, the nine 4×4 intra prediction modes perform an intra prediction in eight directions, respectively, except for the DC mode having no directivity.

Similar to the 4×4 intra prediction mode, the 8×8 intra prediction mode and the 16×16 intra prediction mode include four prediction modes. In an apparatus for encoding the intra prediction mode of H.264/AVC, all of the 4×4 intra prediction mode, the 8×8 intra prediction mode, and the 16×16 intra prediction mode are performed, an optimal mode is selected taking account into RD (Rate-Distortion) costs of a block to be encoded, and then a bitstream is generated.

In order to decode a bitstream encoded by the intra prediction, a receiving side should know information on the intra prediction mode. Accordingly, information on an intra prediction direction is inserted in the bitstream as well as the difference between an intra prediction value and a pixel value of a current block and the bitstream is transmitted. Since the correlation between a prediction direction of the current block and a prediction direction of an adjacent block is high due to the spatial redundancy of an image, the intra prediction direction of the current block is encoded with reference to an intra prediction direction of the adjacent block.

A method of encoding an intra prediction direction according to conventional arts will be described with reference to drawings in more detail.

Figure 3:
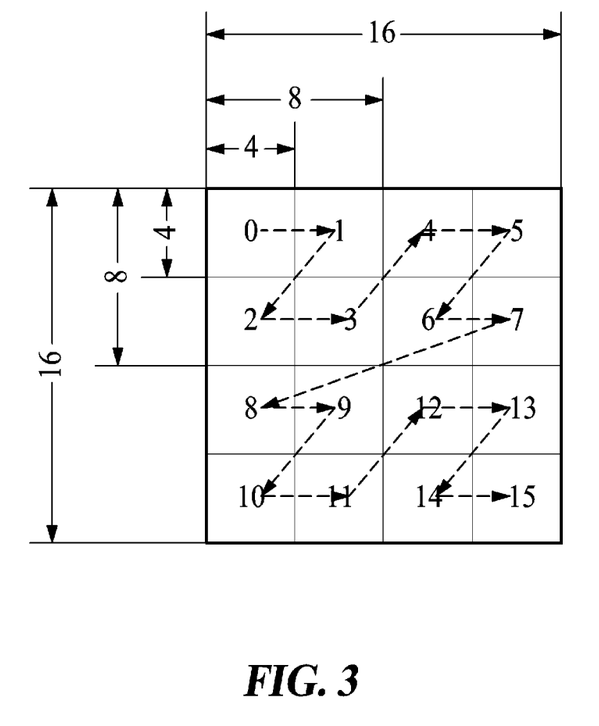
FIG. 3 illustrates orders of an intra prediction encoding and an intra prediction decoding of a 4×4 block.
Figure 4:
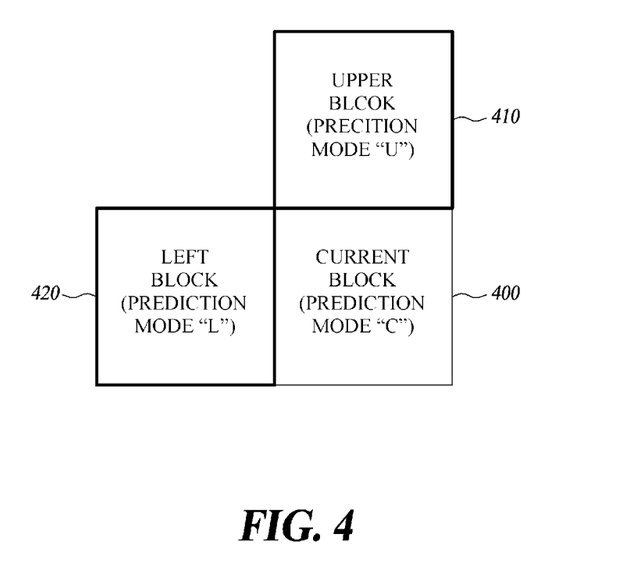
FIG. 4 illustrates positions of a current block and adjacent blocks.

FIGS. 3 and 4 illustrate a method of encoding and decoding a 4×4 intra prediction direction in the H.264.AVC. FIG. 3 illustrates orders of an intra prediction encoding and an intra prediction decoding of a 4×4 block and FIG. 4 illustrates positions of a current block and adjacent blocks.

Referring to FIG. 3, a macro block having a size of 16×16 is divided into sixteen blocks having a size of 4×4 and an intra prediction encoding is performed according to an order of blocks 0 to 15 in the H.264/AVC. A receiving side also decodes a block to be decoded according to an order of blocks 0 to 15 like the encoding order. If the encoding and the decoding are performed according to the order of blocks 0 to 15, it is possible to refer to an intra prediction direction or a pixel value of a block in which the decoding is completed among adjacent blocks when the receiving side decodes a current block.

Referring to FIG. 4, information on the intra prediction direction of the current block 400 is encoded with reference to intra prediction directions of an upper block 410 located in an upper portion of the current block 400 and a left block 420 located in a left portion of the current block 400 in the H.264/AVC. Each of the upper block 410 and the left block 420 have the information on the intra prediction direction because they are encoded before the current block 400 is encoded, and the receiving side can refer to the information on the intra prediction direction because the upper block 410 and the left block 420 are decoded before the current block 400 is decoded.

First, a prediction mode number of the current block 400 is determined by RD costs. Next, a minimum value of intra prediction mode numbers of the upper block 410 and the left block 420 is defined as an MPM (Most Probable Mode) and the MPM is compared with the intra prediction mode number of the current block 400. The intra prediction mode numbers include numbers 0 to 8 allocated according to the number of times of use in the statics, so that there is a high probability in which a minimum value of intra prediction mode numbers of adjacent blocks corresponds to the prediction mode number of the current block.

When the intra prediction mode number of the current block 400 corresponds to the MPM, an intra prediction direction of the current block 400 is encoded as "1" indicating that the intra prediction mode number of the current block 400 corresponds to the MPM and "1" is inserted in a bitstream to be transmitted. Since there is a high probability in which the intra prediction mode of the current block 400 corresponds to the MPM, the information on the intra prediction direction of the current block is more likely to be expressed by "1" and accordingly an information depression is performed. The receiving side can obtain the MPM with reference to the intra prediction mode numbers of the upper block 410 and the left block 420 although the intra prediction direction of the current block 400 is not directly transmitted, so that it is possible to perform a decoding in an intra prediction direction pointed by the MPM.

In contrast, when the intra prediction mode number of the current block 400 does not correspond to the MPM, the intra prediction direction of the current is block is encoded as "0" indicating that the intra prediction mode number of the current block 400 does not correspond to the MPM and "0" is first inserted in a bitstream. Next, the remaining eight intra prediction modes except for the MPM among the nine 4×4 intra predication modes are discriminated by binary numbers having a 3 bit size, and "XXX" corresponding to the intra prediction mode number of the current block 400 is inserted in a bitstream to be transmitted. Accordingly, the information on the intra prediction direction of the current block 400 is expressed by a total of 4 bits.

In the intra prediction mode encoding of the H.264/AVC, information is compressed only when the intra prediction mode number of the current block corresponds to the MPM and the information is not compressed at all when the intra prediction mode number of the current block does not correspond to the MPM. There are conventional technologies to solve the above mentioned problem, and the technologies intend to obtain the higher compression efficiency by newly defining an MPM having the higher reliability. In "efficient encoding technique for 4×4 intra prediction modes using the statistical distribution of intra modes of adjacent intra blocks" disclosed in Journal of Korea Contents Association, Vol. 9, No. 4, pp. 12-18, 2009 by Jae-Min Kim and Hyun-Soo Kang, a histogram to which weights of intra prediction modes are added is constructed for adjacent 4×4 blocks in which an encoding is already completed and a prediction mode having a larger value in the histogram among intra prediction modes of the upper block 410 and the left block 420 is determined as the MPM for the current block. The encoding technique can determine a more exact MPM with reference to the larger number of adjacent blocks. However, the encoding technique has disadvantages of increasing an amount of calculations and rather decreasing the accuracy of the MPM when adjacent blocks in excessively wide areas are referred in a complex image.

There is a conventional technology to determine the MPM more to adaptively according to an image structure without highly increasing an amount of calculations. In "A new method for estimating intra prediction mode in H.264/AVC", IEICE Trans. Fundamentals, Vol. E91-A, No. 6, pp. 1529-1532, June 2008, by Dae-Yeon Kim, Dong-Kyun Kim, and Yung-Lyul Lee, the MPM is determined with reference to four adjacent blocks including an upper block, a left block, a left upper block, and a right upper block. Further, the nine 4×4 intra prediction modes are divided into a vertical mode group, a horizontal mode group, a diagonal down-left mode group, and a diagonal down-right mode group, and then the MPM is determined according to a kind of groups including intra prediction modes of adjacent blocks. The method can determine a suitable MPM for a structure around the current block by using a fact that an intra prediction mode of each block expresses the directivity of an edge existing in a corresponding block. However, the method cannot solve a basic problem in which information is not compressed at all when the intra prediction mode of the current block does not correspond to the determined MPM.

Accordingly, a method and an apparatus for encoding the intra prediction mode are required to compress intra prediction information for the current block by more efficiently using the similarity included in adjacent blocks within a screen in comparison with the conventional art.

DISCLOSURE

Technical Problem

Therefore, the present disclosure has been made in view of the above mentioned problems to provide in one aspect a method and an apparatus for encoding intra prediction modes using variable length codes, and a recording medium for the same, which can increase the compression efficiency of the intra prediction encoding by using the structural similarity of an image existing between adjacent blocks within a screen and the directivity of the intra prediction modes even when an intra prediction mode of a current block does not correspond to intra prediction modes of adjacent blocks.

Technical Solution

An aspect of the present disclosure provides a method of encoding an intra prediction mode of an image by using variable length codes, the method including determining an intra prediction mode of a current block; determining an intra prediction mode having a smallest mode number among intra prediction modes of encoded adjacent blocks as an MPM (Most Probable Mode); is generating and allocating variable length codes in an ascending order from a shorter code with a higher similarity for a directivity with the MPM for all intra prediction modes; and encoding the intra prediction mode of the current block based on the allocated variable length codes.

Another aspect of the present disclosure provides an apparatus for encoding an intra prediction mode of an image by using variable length codes, the apparatus including an intra prediction direction determiner for determining an intra prediction mode of a current block; a variable length code generator for determining an intra prediction mode having a smallest mode number among intra prediction modes of encoded adjacent blocks as an MPM (Most Probable Mode) and generating and allocating variable length codes in an ascending order from a shorter code with a higher similarity for a directivity with the MPM for all intra prediction modes; and an intra prediction mode encoder for encoding the intra prediction mode of the current block based on the allocated variable length codes.

Another aspect of the present disclosure provides a computer readable recording medium for recording a program for intra prediction mode encoding by using variable length codes, the computer readable recording medium including the functions of: determining an intra prediction mode of a current block; determining an intra prediction mode having a smallest mode number among encoded intra prediction modes of adjacent blocks as an MPM (Most Probable Mode); generating and allocating variable length codes in an ascending order from a shorter code with a higher similarity for a directivity with the MPM for all intra prediction modes; and encoding the intra prediction mode of the current to block based on the allocated variable length codes.

Advantageous Effects

According to the present disclosure as described above, efficient variable length codes are generated considering the high correlation existing between the current block and adjacent blocks and information on the intra prediction mode of the current block is efficiently compressed by using the generated variable length codes even when the intra prediction mode of the current block does not correspond to the MPM derived with reference to adjacent blocks, so that it is possible to improve the intra encoding performance.

MODE FOR INVENTION

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other and not to imply or suggest the substances, order or sequence of the components. If a component is described as 'connected', 'coupled', or 'linked' to another component, they may mean the components are not only directly 'connected', 'coupled', or 'linked' but also are indirectly 'connected', 'coupled', or 'linked' via a third component.

Figure 5:
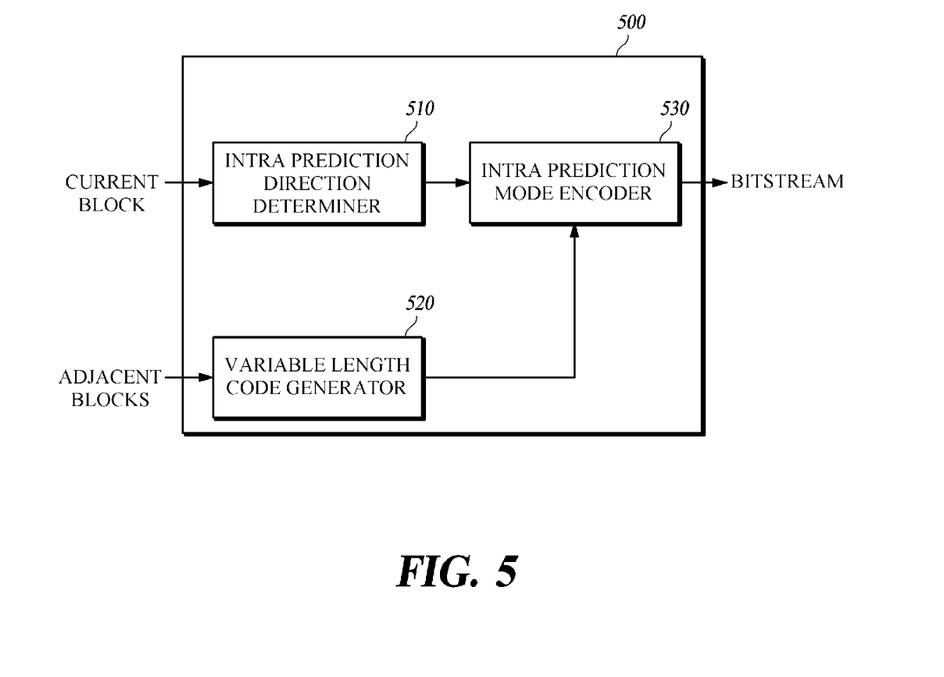
FIG. 5 is a block diagram of an intra prediction mode encoding apparatus using variable length codes according to an aspect of the present disclosure.

FIG. 5 is a block diagram of an intra prediction mode encoding apparatus 500 using variable length codes according to an aspect of the present disclosure. As shown in FIG. 5, the intra prediction mode encoding apparatus 500 includes an intra prediction direction determiner 510, a variable length code generator 520, and an intra prediction mode encoder 530.

The intra prediction direction determiner 510 receives an input of a current 4×4 block and determines a prediction mode having the smallest RD costs among the nine 4×4 intra prediction modes shown in FIG. 1 as an intra prediction mode (or referred to as a "direction") of the current block. An intra prediction value for the current block is generated according to the intra prediction direction as determined above, the difference between the prediction value and a pixel value of the current block is encoded via a transform and a quantization, and then the intra prediction mode of the current block is encoded with reference to intra prediction modes of adjacent blocks.

The variable length code generator 520 determines an MPM (Most Probable Mode) with reference to the intra prediction modes of the adjacent blocks, in which an encoding is completed before the current block is encoded, in order to increase the compression efficiency of the encoding for the intra prediction mode of the current block, and then generates and allocates variable is length codes in an ascending order from a shorter code with the higher similarity for directivity with the MPM for the nine 4×4 intra prediction modes shown in FIG. 1. An intra prediction mode having the smallest mode number among intra prediction modes of encoded adjacent blocks is determined as the MPM. An intra prediction mode having the similar directivity to the MPM has a high probability of being determined as the intra prediction mode of the current block. As a result, the efficiency of encoding intra prediction modes may be increased. A variable length code generating method implemented by the variable length code generator 520 will be discussed in detail in a description of an intra prediction mode encoding method using variable length codes according to aspects of the present disclosure with reference to FIG. 6.

The intra prediction mode encoder 530 encodes the intra prediction mode of the current block by using variable length codes generated through the variable length code generator 520 and inserts the encoded intra prediction mode in a bitstream.

Figure 6:
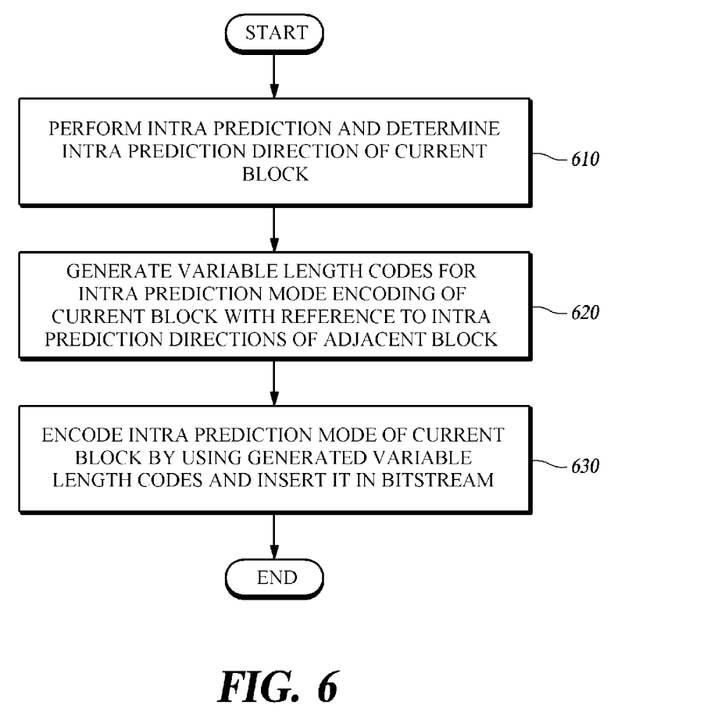
FIG. 6 is a flowchart for describing an intra prediction mode encoding method using variable length codes according to an aspect of the present disclosure.

FIG. 6 is a flowchart for describing an intra prediction mode encoding method using variable length codes according to an aspect of the present disclosure. The method is applied to the apparatus of FIG. 5 so that the method is described in conjunction with an operation of the apparatus.

Referring to FIG. 6, the intra prediction mode encoding method using variable length codes according to an aspect of the present disclosure includes determining an intra prediction direction of a current block by performing an intra prediction of the current block in step 610, generating variable length codes for the intra prediction mode encoding of the current block with reference to intra prediction directions of adjacent blocks in step 620, and encoding the intra prediction mode of the current block by using the generated variable length codes and inserting the encoded intra prediction mode in a bitstream in step 630.

Hereinafter, the intra prediction mode encoding method will be described in more detail.

In step 610, when the intra prediction direction determiner 510 performs a 4×4 intra prediction for a current block, the intra prediction direction is determiner 510 performs all nine intra prediction modes and determines a prediction mode having the smallest RD costs as an intra prediction mode of the current block. When the intra prediction direction is determined, an intra prediction value for the current block is generated in the determined direction and the difference between the prediction value and a pixel value of the current block is encoded through a transform and a quantization. Then, the intra prediction mode for the current block is encoded with reference to intra prediction modes of adjacent blocks.

In step 620, the variable length code generator 520 generates variable length codes by using intra prediction modes of adjacent blocks in order to encode the intra prediction mode of the current block. First, the variable length code generator 520 determines a minimum value having the smallest mode number among intra prediction modes of the upper block 410 located in an upper portion of the current block 400 and the left block 420 located in a left portion of the current block 400 as the MPM.

In the intra prediction mode encoding method according to a conventional art, the MPM may be determined with reference to the larger number of adjacent blocks. However, if the intra prediction mode of the current block does not correspond to the MPM although the MPM is accurately obtained, it is not possible to acquire the compression efficiency for information. In the intra prediction mode encoding method according to another conventional art, the encoding is performed according to whether the intra prediction mode of the current block corresponds to intra prediction modes of adjacent blocks other than the MPM. However, it is also not possible to acquire the compression efficiency for information when there is no adjacent block having an intra prediction mode corresponding to the intra prediction mode of the current block.

Accordingly, in the aspect of the present disclosure, it is possible to increase the efficiency for the intra prediction mode encoding by using the correlation for the directivity of the intra prediction mode even when the intra prediction mode of the current block does not accurately correspond to intra prediction modes of adjacent blocks. That is, only when the intra prediction is mode of the current block accurately corresponds to the MPM among intra prediction modes of adjacent blocks, a 1 bit flag is used. When the intra prediction mode of the current block does not correspond to the MPM, the compression efficiency can be increased by using variable length codes unlike the conventional art using fixed length codes. In the method using the variable length codes, a code having a short length is allocated to an intra prediction mode similar to a direction of the MPM among intra prediction modes of adjacent blocks.

Although the intra prediction mode of the current block does not correspond to intra prediction modes of adjacent blocks, the adjacent blocks have the high spatial similarity because the adjacent blocks are located within the same region. As a result, there is a high probability in which spatial structures of pixel values within blocks, that is, intra prediction modes are similar. For example, when the adjacent blocks are included in a flat region, there is a high probability in which the current block is also included in the flat region, and, when the adjacent blocks are located in an edge region, there is a high probability in which the current block is also located in the edge region. An intra prediction mode of a block effectively represents a structural characteristic of a block having the same directivity as an edge existing in a corresponding block, so that intra prediction modes of adjacent blocks have a high probability of being similar to each other. Accordingly, the aspect of the present disclosure allocates a code having a shorter length to an intra prediction mode, which is different from intra prediction modes of adjacent blocks but has similar directivity to that of the intra prediction modes of the adjacent blocks, that is, an intra prediction mode having a high probability of being determined as the intra prediction mode of the current block through the variable length code generator 620, which increases the compression efficiency. The variable length code generating method according to an aspect of the present disclosure will be described in more detail with reference to FIGS. 7 and 8.

Figure 7:
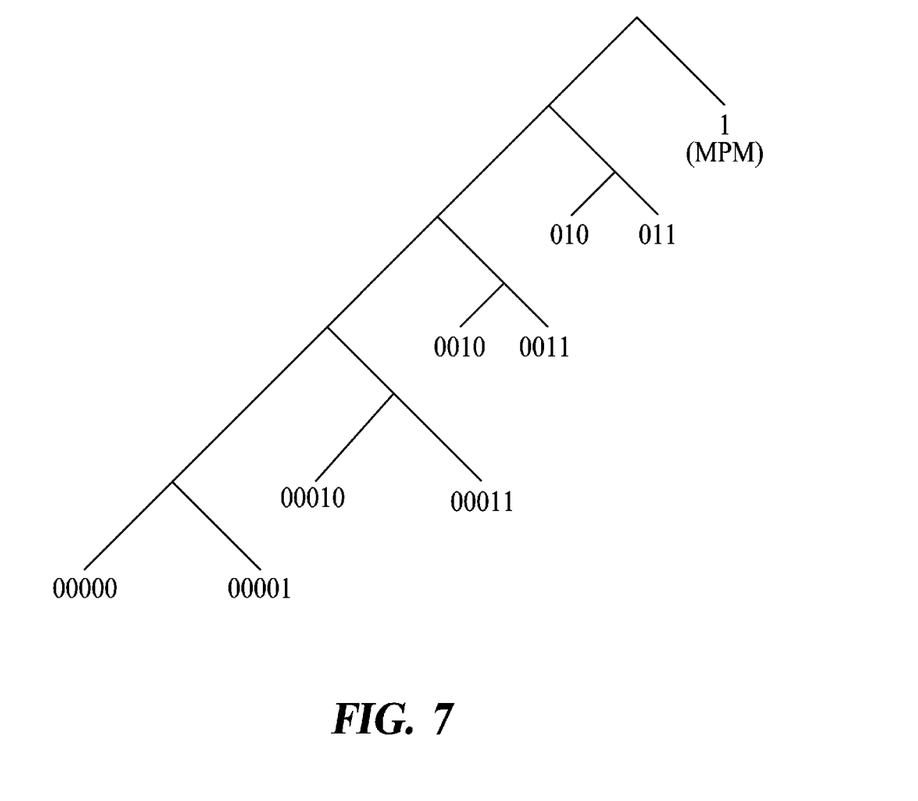
FIG. 7 is a view for describing a variable length code generating method for encoding a 4×4 intra prediction mode according to aspects of the present disclosure.

FIG. 7 is a view for describing a variable length code generating method for encoding a 4×4 intra prediction mode according to aspects of the present disclosure.

Referring to FIG. 7, a total of nine variable length codes are generated for nine 4×4 intra prediction modes shown in FIG. 1. In general, there should not be a prefix between respective codes in order to enable a decoder to receive variable length codes to perform an exact decoding since a length of each code is irregular in variable length codes unlike a fixed length code. Accordingly, the variable length codes according to the aspect of the present disclosure are generated by a binary tree as shown in FIG. 7. As a result, the variable length codes according to the aspect of present disclosure include one code "1", which is 1 bit long, two codes "010" and "011", which are 3 bits long, two codes "0010" and "0011", which are 4 bits long, and four codes "0000", "00001", "00010" and "00011", which are 5 bits long.

In the aspect of the present disclosure, the variable length code generator 520 sequentially allocates the nine variable length codes generated as described above to the nine 4×4 intra prediction modes shown in FIG. 1. As an intra prediction mode has a higher probability of being determined as the intra prediction mode of the current block, a code having a shorter length is allocated to the intra prediction mode. That is, an intra prediction mode having the highest probability of being determined as the intra prediction mode of the current block is allocated a 1 bit code, which is a code having the shortest length, and an intra prediction mode having the lowest probability of being determined as the intra prediction mode of the current block is allocated a 5 bit code, which is a code having the longest length.

Figure 8:
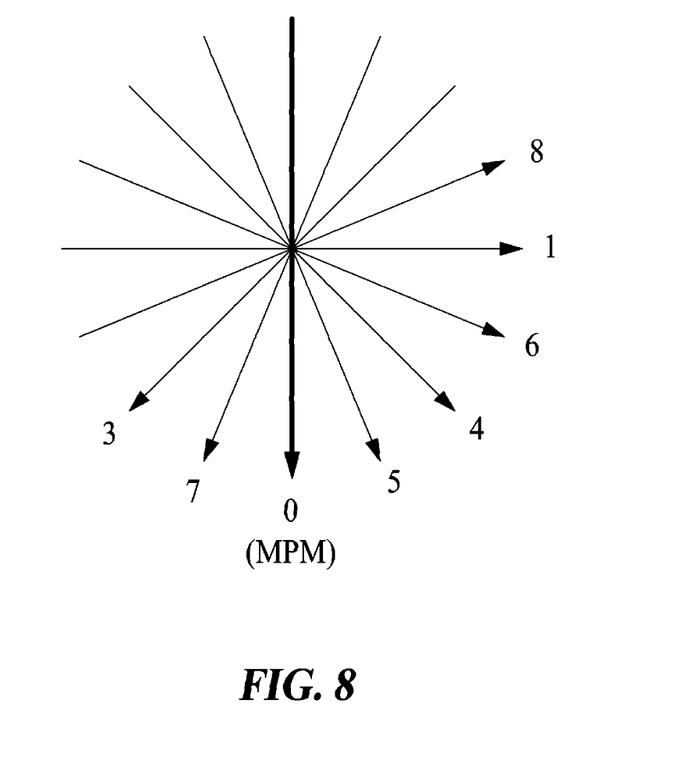
FIG. 8 is an example for describing the variable length code generating method according to aspects of the present disclosure.

FIG. 8 is an example for describing the variable length code generating method according to aspects of the present disclosure. As shown in FIG. 8, a case is described where an MPM determined as a minimum value among intra prediction modes of the upper block 410 and the left block 420 corresponds to the vertical mode having a mode number "0".

Referring to FIG. 8, when the MPM is determined as the vertical mode having the mode number "0" by a minimum value of the intra prediction modes of the upper block 410 and the left block 420, it is determined that the intra prediction mode of the current block 400 has the highest probability of being determined as the vertical mode having the mode number "0" and a code "1" having a 1 bit length is allocated to the vertical mode having the mode number "0".

Referring back to FIG. 8, intra prediction modes having the most similar directivity to the vertical mode having the mode number "0" are the vertical-right mode having the mode number "5" and the vertical-left mode having the mode number "7". Considering the similarity of intra prediction modes between the current block and adjacent blocks, the vertical-right mode having the mode number "5" and the vertical-left mode having the mode number "7" have the second highest probability of being determined as the intra prediction mode of the current block, next to the MPM. Accordingly, the code "010" having a 3 bit length is allocated to the vertical-right mode having the mode number "5" and the code "011" is allocated to the vertical-left mode having the mode number "7". In such a case where bit lengths of codes to be allocated are the same as each other, a code having a smaller binary value is allocated to a mode having a smaller prediction mode number. Similarly, considering the similarity of intra prediction modes between the current block and adjacent blocks, it is determined that intra prediction modes are more likely to be determined as the intra prediction mode of the current block in an order of "0→(5,7)→(3,4)→(1,2,6,8). Accordingly, the code "0010" having a 4 bit length is allocated to the diagonal down-left mode having the mode number "3" and the code "0011" is allocated to the diagonal down-right mode having the mode number "4". Further, codes having a 5 bit length, which is the longest length, "00000", "00001", "00010", and "00011" are allocated to the vertical mode having the mode number "1", the DC mode having the mode number "2", the horizontal-down mode having the mode number "6", and the horizontal-up mode having the mode number "8", respectively.

In the example illustrated in FIG. 8, variable length codes allocated to the nine 4×4 intra prediction modes may be defined by Table 1. The Table 1 shows a result in which a code having a shorter length is allocated to an intra prediction mode having a higher probability of being determined as the intra prediction mode of the current block in consideration of the high correlation of intra prediction modes between the current block and adjacent blocks.

TABLE 1

| 4 × 4 intra prediction mode | Variable length code |
|---|---|
| 0 (MPM) | "1" |
| 5 | "010" |
| 7 | "011" |
| 3 | "0010" |
| 4 | "0011" |
| 1 | "00000" |
| 2 | "00001" |
| 6 | "00010" |
| 8 | "00011" |

As shown in table 1, if variable length codes are used to encode the intra prediction mode of the current block, when the intra prediction mode of the current block is determined as two intra prediction modes which are similar to the MPM, an intra prediction mode which should be indicated by 4 bits can be expressed by 3 bits in the conventional art, so that the bit decreasing effect can be obtained. However, when the intra prediction mode of the current block is determined as four intra prediction modes which are not similar to the MPM, an intra prediction mode is indicated by 5 bits which are larger than 4 bits, so that the number of bits may be increased but the effect of decreasing the bits can be further improved. As described in connection with the example of FIG. 8, the intra prediction mode of the current block has a high probability of having similar directivity to that of intra prediction modes of adjacent blocks and thus the intra prediction mode of the current block has a larger number of cases where the intra prediction mode of the current block is determined in a similar direction to that of the MPM than the number of cases where the intra prediction mode of the current block is determined in a different direction from that of the MPM.

Referring back to FIG. 6, in step 630, the intra prediction mode encoder 530 encodes the intra prediction mode of the current block by using the variable length codes generated in step 620 and inserts the encoded intra prediction mode in a bitstream.

The intra prediction mode encoding method according to aspects of the present disclosure described with reference to FIGS. 6 to 8 may be implemented by a computer readable recording medium including a program instruction for performing an operation executed by various computers. The computer readable medium may individually or integratively include a program command, a data file, and a data structure. The program command of the medium may be specially designed and constructed for the present disclosure, or may be available because it has been known to those skilled in computer software. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. For example, the program command includes a high level language code, which may be executed by a computer by using an interpreter, as well as a machine language code made by a compiler.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a is person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the aspects of the present disclosure are highly useful for application in the fields of compressing image data. Accordingly, even when the intra prediction mode of the current block does not correspond to the MPM derived with reference to adjacent blocks, efficient variable length codes are generated considering the high correlation existing in intra prediction modes of the current blocks and the adjacent blocks and information on the intra prediction mode of the current block is efficiently compressed using the generated variable length codes, so that the intra encoding performance of an image is improved.

The invention claimed is:
1. A method of encoding an intra prediction mode of an image by using variable length codes, the method comprising:
   determining an intra prediction mode of a current block;
   determining an intra prediction mode having a smallest mode number among intra prediction modes of encoded adjacent blocks as an MPM (Most Probable Mode);

generating and allocating variable length codes in an ascending order from a shorter code with a higher similarity for a directivity with the MPM for all intra prediction modes; and encoding the intra prediction mode of the current block based on allocated variable length codes.

2. The method as claimed in claim 1, wherein the variable length codes are generated by using a binary tree.

3. The method as claimed in claim 2, wherein the variable length codes comprise "1", "010", "011", "0010", "0011", "00000", "00001", "00010", and "00011" in an order of codes having a shorter length when a code of the MPM is "1".

4. The method as claimed in claim 1, wherein, for intra prediction modes having an identical similarity, the variable length codes are allocated based on mode numbers and binary values of the variable length codes.

5. An apparatus for encoding an intra prediction mode of an image by using variable length codes, the apparatus comprising:

an intra prediction direction determiner for determining an intra prediction mode of a current block;

a variable length code generator for determining an intra prediction mode having a smallest mode number among intra prediction modes of encoded adjacent blocks as an MPM (Most Probable Mode) and generating and allocating variable length codes in an ascending order from a shorter code with a higher similarity for a directivity with the MPM for all intra prediction modes; and an intra prediction mode encoder for encoding the intra prediction mode of the current block based on allocated variable length codes.

6. The apparatus as claimed in claim 5, wherein the variable length code generator generates the variable length codes by using a binary tree.

7. The apparatus as claimed in claim 6, wherein the variable length codes comprise "1", "010", "011", "0010", "0011", "00000", "00001", "00010", and "00011" in an order of codes having a shorter length when a code of the MPM is "1".

8. The apparatus as claimed in claim 5, wherein for intra prediction modes having an identical similarity, the variable length code generator allocates the variable length codes based on intra prediction mode numbers and binary values of the variable length codes.

9. A non-transitory computer readable recording medium for recording a program for intra prediction mode encoding by using variable length codes, the computer readable recording medium comprising the functions of:

determining an intra prediction mode of a current block;

determining an intra prediction mode having a smallest mode number among encoded intra prediction modes of adjacent blocks as an MPM (Most Probable Mode);

generating and allocating variable length codes in an ascending order from a shorter code with a higher similarity for a directivity with the MPM for all intra prediction modes; and encoding the intra prediction mode of the current block based on allocated variable length codes.

\* \* \* \* \*